May 1, 1923.
N. BROWNE
AUTOMOBILE SIGNAL
Filed March 26, 1920
1,453,911
6 Sheets-Sheet 2
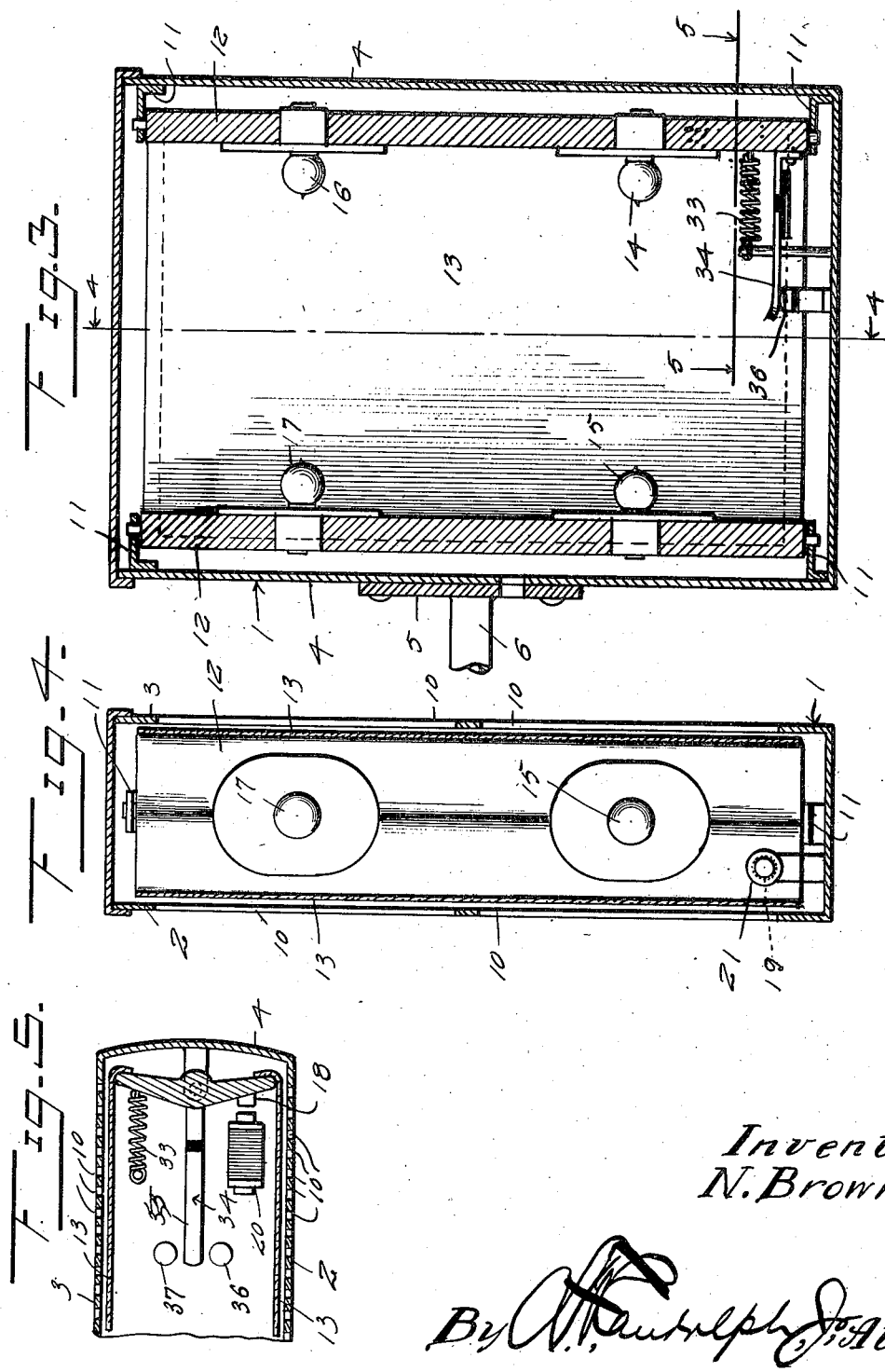
Inventor
N. Browne May 1, 1923.
N. BROWNE
AUTOMOBILE SIGNAL
Filed March 26, 1920    6 Sheets-Sheet 3
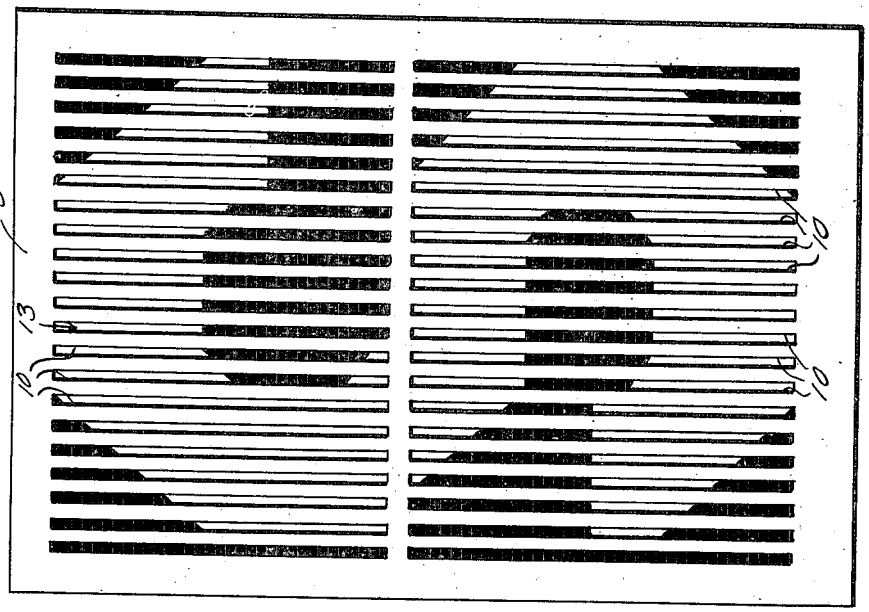
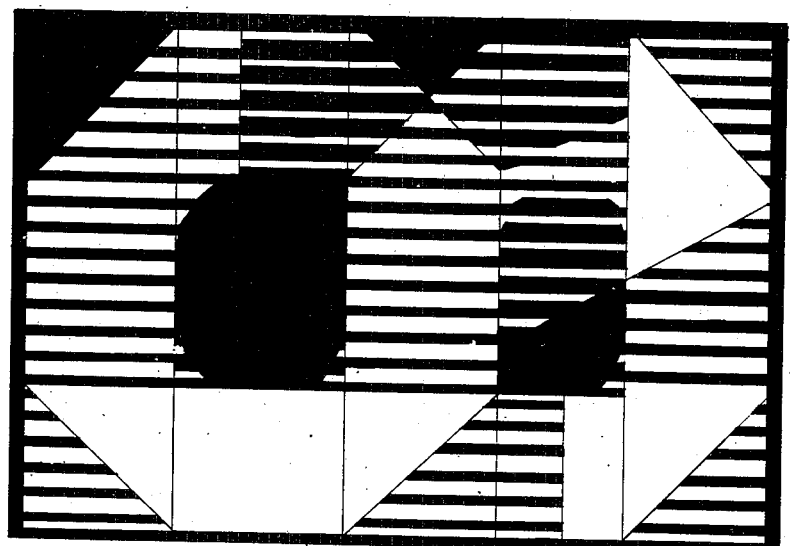
Inventor
N. Browne
By Randolph Jr., Atty

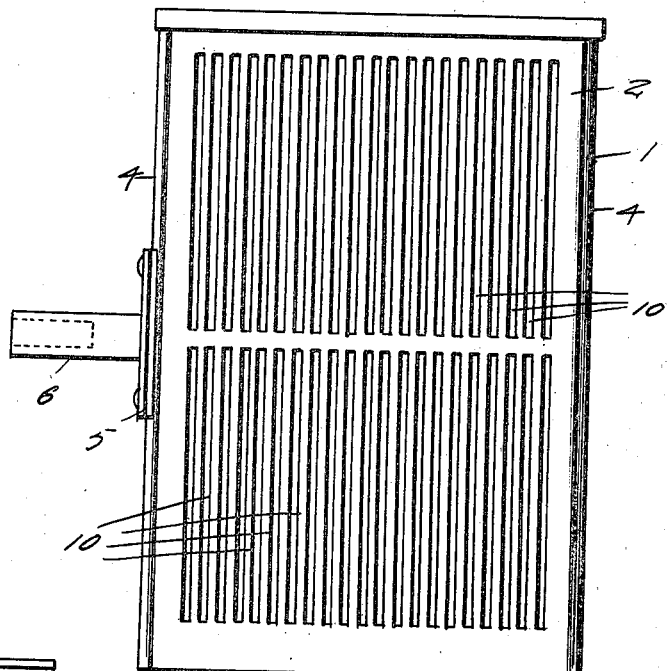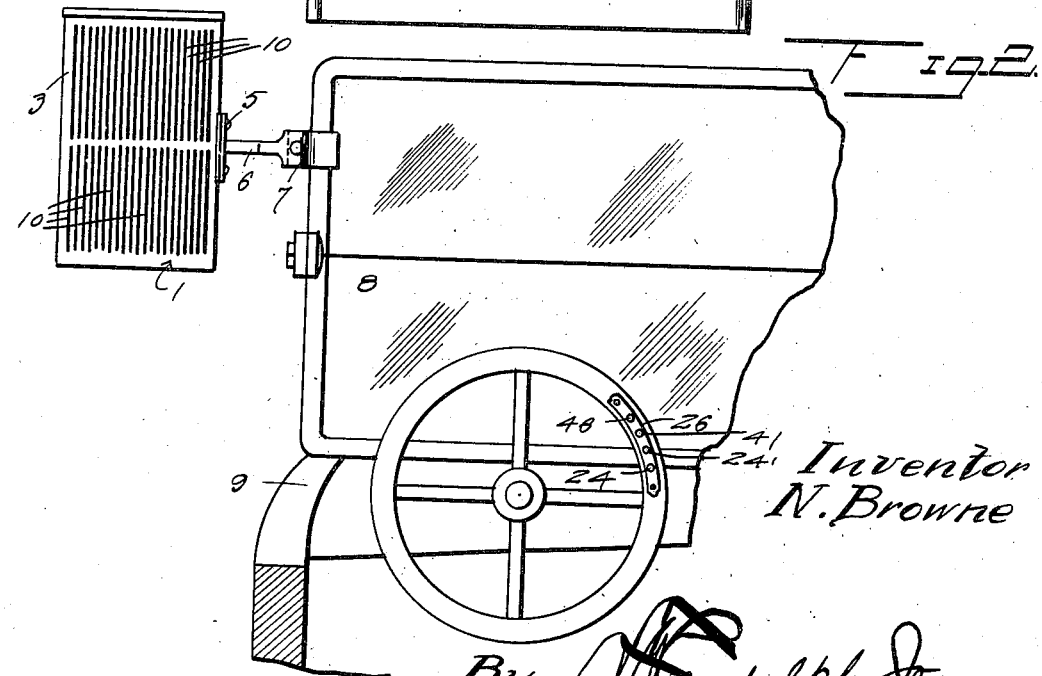

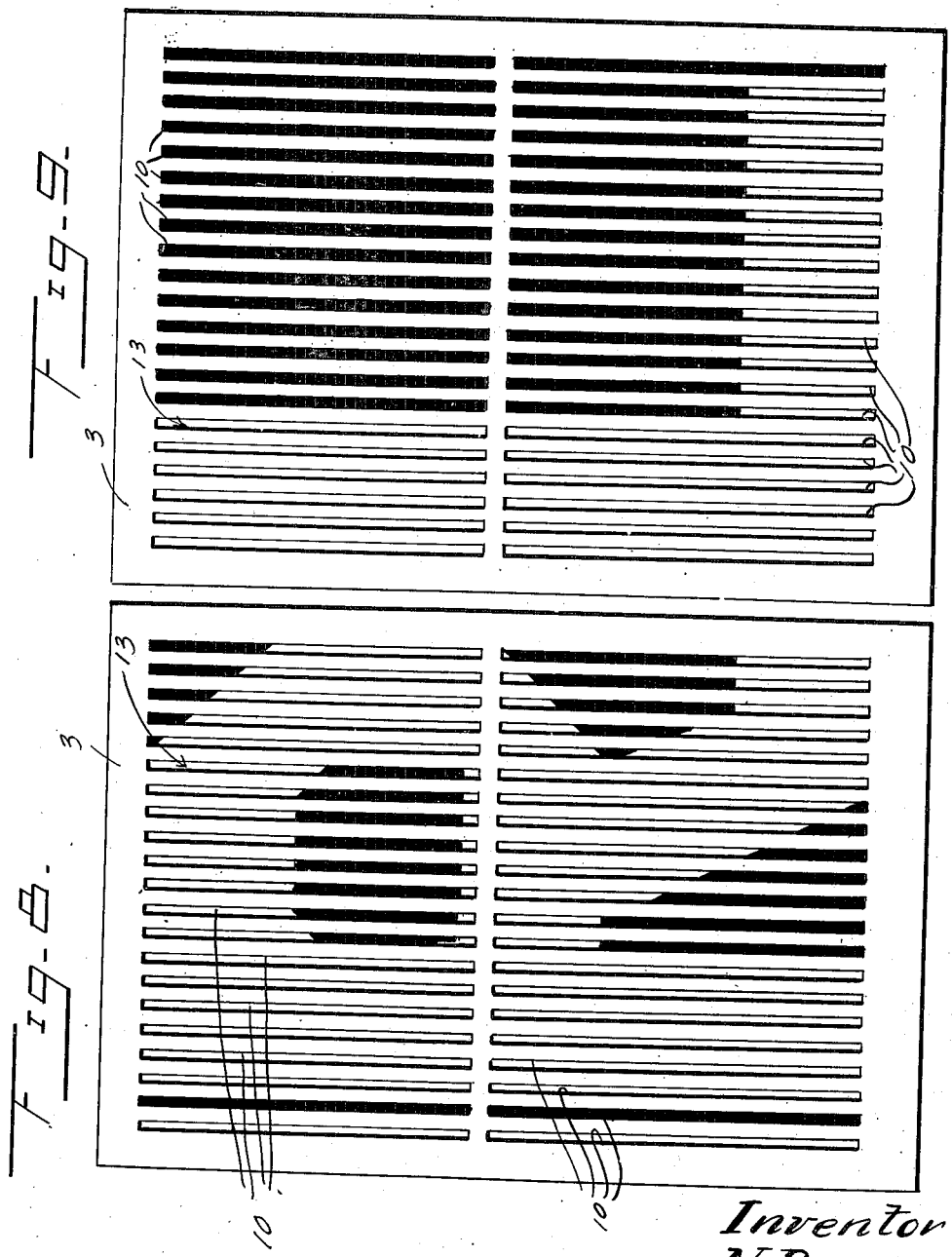

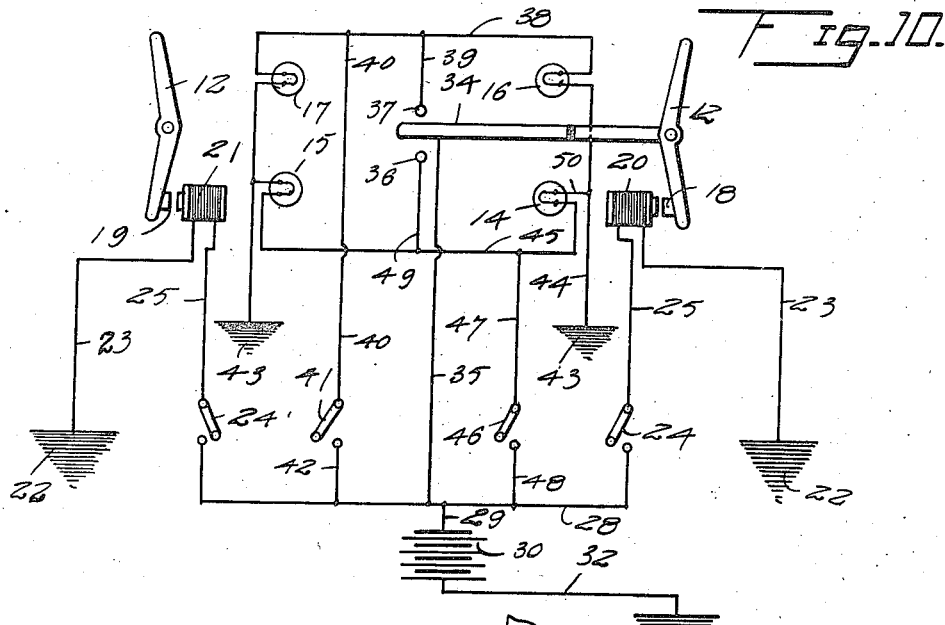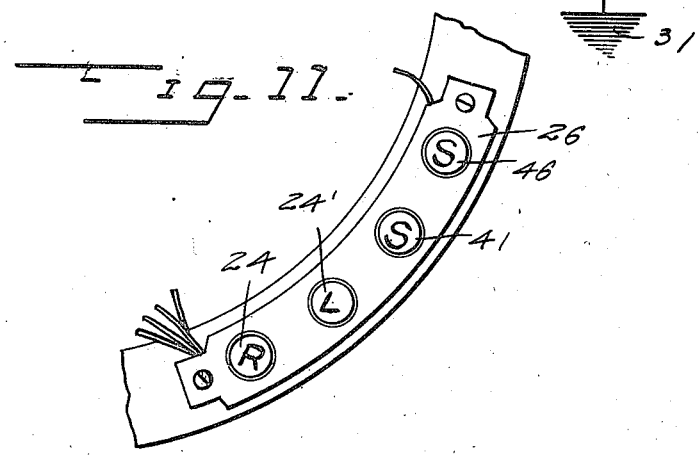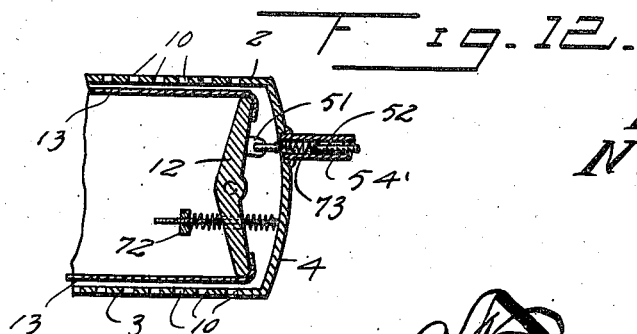

May 1, 1923.
N. BROWNE
AUTOMOBILE SIGNAL
Filed March 26, 1920
1,453,911
6 Sheets-Sheet 6
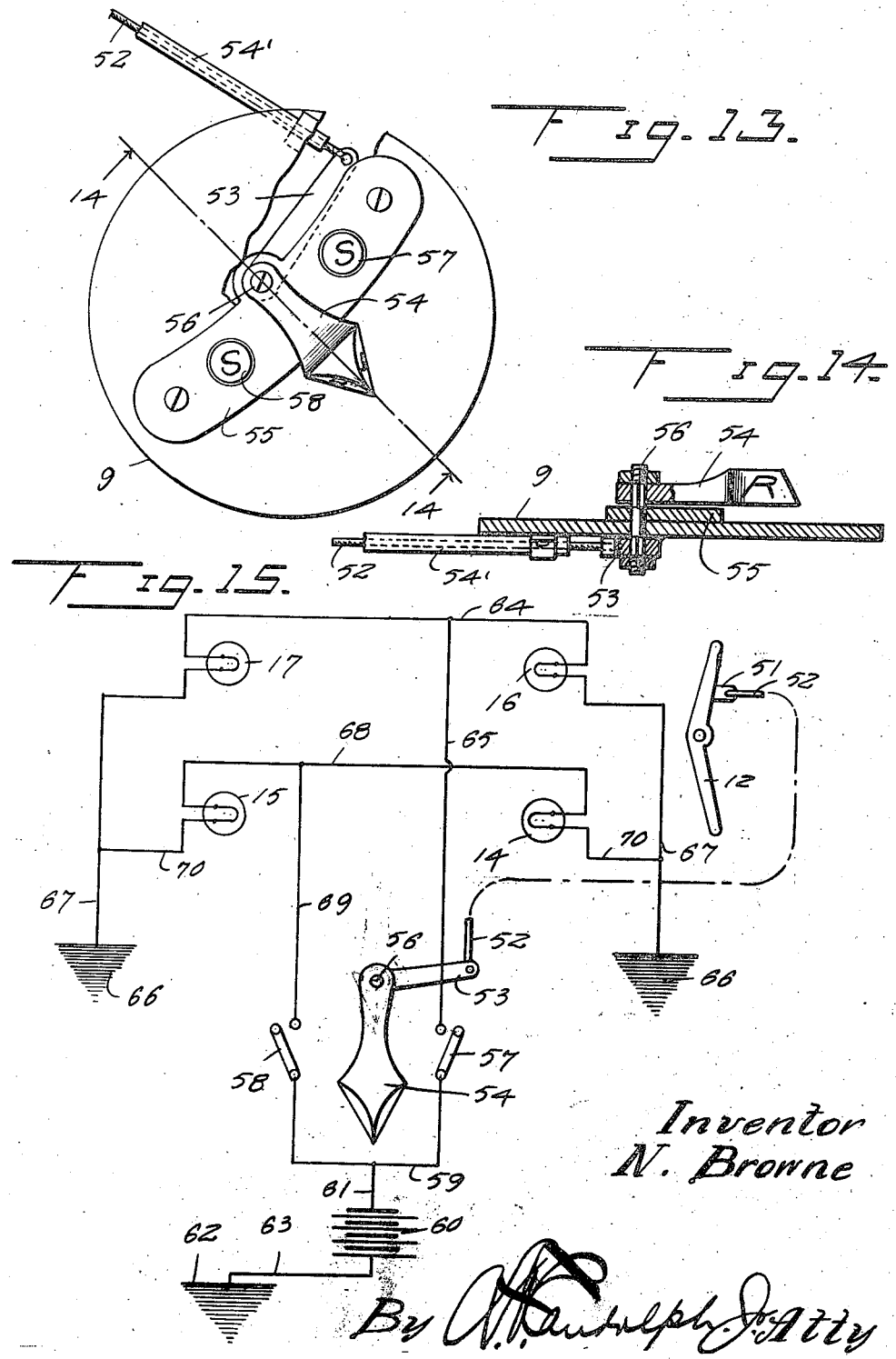

Patented May 1, 1923.

1,453,911

UNITED STATES PATENT OFFICE.

NORTON BROWNE, OF CHELAN, WASHINGTON.

AUTOMOBILE SIGNAL.

Application filed March 26, 1920. Serial No. 368,974.

*To all whom it may concern:*

Be it known that I, NORTON BROWNE, a citizen of the United States, residing at Chelan, in the county of Chelan and State of Washington, have invented certain new and useful Improvements in Automobile Signals; and I do hereby declare the following to be a full, clear, and exact description of the invention, such as will enable others skilled in the art to which it appertains to make and use the same.

This invention relates to new and useful improvements in automobile signals of the character employing several signaling characters to indicate or warn traffic of turns from a straight course, also to indicate a stop and reduction of speed of the respective automobile, and has for one of its objects the provision of a casing having slotted walls, and a screen or slide bearing characters arranged in a group and disposed in rear of the slotted walls and adapted to be moved in relation to the slots of the walls for exposing the desired character through the slot thereby indicating to the traffic the direction or procedure of the respective automobile.

Another object of this invention is the provision of means for illuminating the characters, and which means is capable of producing different colors so as to provide a different color for each character or signal, thus making the signals or characters readily distinguishable from each other to the traffic.

A further object of this invention is the provision of means whereby one signaling character which is normally in registration with the slots of the walls will not be noticeable until illuminated and the illuminating means is so arranged or capable of making different colors to indicate "stop" and "slow" or reduction of speed to the respective automobile.

A still further object of this invention is the provision of an automobile signal of the above stated character, which shall be simple, durable, and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1 is a front elevation of an automobile signal constructed in accordance with my invention, Figure 2 is a rear elevation of the same, illustrating the signal applied to the wind shield of an automobile, Figure 3 is a vertical sectional view, illustrating the light in the casing, Figure 4 is a longitudinal sectional view illustrating the mounting of the screens or slides, Figure 5 is a detail sectional view illustrating means for returning the screens or slides to their initial position, Figure 6 is a plan view of one of the screens or slides illustrating the group of signaling characters thereon, Figure 7 is a plan view of the slide or screen illustrating the character "S" thereon and as it would appear through the casing when said slide or screen is in its initial position and illuminated, Figure 8 is a similar view illustrating the character "R,"

Figure 9 is a similar view illustrating the character "L,"

Figure 10 is a diagrammatical view of the wiring diagram,

Figure 11 is a fragmentary plan view illustrating the control buttons,

Figure 12 is a detail sectional view illustrating a cable for operating the screen or slide and its connection therewith, Figure 13 is a detail plan view of a switch and lever for operating the cable.

Figure 14 is a sectional view of the same,

Figure 15 is a diagrammatical view of the wiring diagram used with the cable control.

Referring in detail to the drawings, the numeral 1 indicates as an entirety a direction indicating casing including front and rear walls 2 and 3 and end walls 4. One of the end walls 4 has secured thereto a plate 5 on which is formed an arm 6 provided with a suitable clamp 7 for gripping a wind shield 8 of an automobile 9 so as to position the casing at a point on the automobile where it can be easily seen from the front and rear of the respective automobile by the traffic. I do not desire to be limited in the applying of the casing to the wind shield as the same can be applied at any other point on the automobile by employing another means on the arm 6 for securing the same to said automobile.

The front and rear walls 2 and 3 of the casing are provided with vertically disposed and relatively spaced slots 10 through which the various characters are adapted to be exposed or seen. Brackets 11 are secured to the upper and lower ends of the end walls 4 and have pivotally connected thereto supporting members 12, the edges of which are disposed in close proximity to the inner faces of the front and rear walls and have connected thereto screens or slides 13 that lie in close proximity to the inner faces of said front and rear walls. The screens or slides are constructed from any desired material which is translucent or semi-transparent and have coated or otherwise applied thereon in a group the letters "S", "R", and "L" in opaque material. The characters are formed by stripes of opaque coating arranged in spaced relation to agree with the slots of the front and rear walls 2 and 3 so that upon moving the slide or screen in relation to the slots of the walls, the different characters above referred to will be brought into registration with said slots and when illuminated will be clearly noticeable from the exterior of the casing. The front and rear walls of the casing 1 are painted or coated the same color as the screens or slides thus rendering the characters non-distinguishable through the casing until illuminated. The character "S" standing for "Stop" and "Slow" is normally in registration with the slots of the front and rear walls and when illuminated by different colors will be readily noticeable by the traffic to indicate stops and slow. The letter "S" at one time is illuminated red to indicate "Stop" while at another time it is illuminated green to indicate "Slow" or a reduction in the speed of the respective automobile. The shifting of the slides or screens in one direction will bring the character "R" in registration with the slots of the front and rear walls, and is adapted to be illuminated red to indicate a turn to the right and on shifting the screens or slides in an opposite direction, the letter "L" will be brought into registration with the slots of the front and rear walls and is adapted to be illuminated green to indicate a turn to the left.

Electric lamps 14 and 15 are secured to the lower portions of the operating members 12 and are preferably colored green and electric lamps 16 and 17 are carried by the supporting members 12 and are preferably colored red. The green electric lamps 14 and 15 are adapted to be simultaneously illuminated when the character "L" is in registration with the slots 10 to indicate a turn to the left, and also the same lights are adapted to be illuminated when the character "S" is in registration with the slots 10 for indicating a reduction in the speed of the respective automobile or slow. The electric lamps 16 and 17 are adapted to be simultaneously illuminated when the character "R" is brought in registration with the slots 10 to indicate a turn to the right and also adapted to be illuminated when the character "S" is in registration with the slots to indicate a stop.

Armatures 18 and 19 are secured to the supporting members 12 and insulated therefrom and are adapted to be attracted by magnets 20 and 21 in the casing and the magnets are connected to a ground 22 by wires 23 and the magnets also are connected to switches 24 and 24' by wires 25. The switches 24 and 24' are in the form of push buttons carried by a supporting plate 26 adapted to be secured at any desirable point on the automobile 9 and preferably upon the steering wheel 27. The switches 24 and 24' are connected together by a wire 28 to which is connected a wire 29 that is connected to one pole of a battery or other electrical source 30. The other pole of the battery or other electric source is connected to a ground 31 by a wire 32 so that upon closing either of the switches 24 or 24' the magnet 20 or 21 will be energized to move the slides or screens in either direction for the purpose of bringing the characters "R" and "L" in registration with the slots 10 of the front and rear walls of the casing. A spring 33 is connected to one of the supporting members 12 for returning the slides or screens to their initial position when either of the magnets 20 or 21 are deenergized.

A contact arm 34 is secured to one of the supporting members 12 and insulated therefrom and has connected thereto a conductor 35 which is connected to the wire 28. Contacts 36 and 37 are located within the casing within the path of the contact arm 34 so that when the contact arm 34 is moved or swung in one direction caused by moving the screens or slides in one direction will engage the contact 36 and when moved in an opposite direction it will engage the contact 37.

The electric lamps 16 and 17 are connected together by a wire 38 and which has connected thereto wires 39 and 40. The wire 39 is connected to the contact 37 while the wire 40 is connected to a switch 41 in the form of a push button located on the supporting plate 26 and is connected to the wire 28 by a wire 42. The electric lamps 16 and 17 are connected to grounds 43 by wires 44. The electric lamps 14 and 15 are connected together by a wire 45 which is connected to a switch 46 by a wire 47. The switch 46 is of the push button type and is carried by the supporting plate 26 and is connected to the wire 28 by a wire 48. The contact 36 is connected to the wire 45 by a wire 49 and the electric lamps 14 and 15 are connected to the wires 44 by wires 50 to indicate "Slow" or a reduction of speed of the respective automobile. The switch 46 is manually closed which completes an electric circuit to the electric lamps 14 and 15 rendering a green light, also making the letter "S" appear green through the slots of the casing. The current travels from the battery through the wires 29, 28, and 48 to the switch and from the switch through the wires 47 and 45 to the electric lamps 14 and 15 whence it passes to the grounds 43 by the wires 50 and 44. To indicate "Stop", the switch 41 is manually closed completing an electric circuit to the electric lamps 16 and 17, making the "S" appear red through the slots of the casing. It is to be understood that the character "S" is normally in registration with the slots of the casing so that on illumination of either of the sets of the electric lamps "Slow" will be indicated by green color and "Stop" by red color. When the switch 41 is closed the current passes from the battery to the switch by way of the wires 29, 28, and 42 and from the switch to the electric lamps 16 and 17 by wires 40 and 38 and from the electric lamps 16 and 17 to the grounds 43 by the wires 44. When the magnet 20 is energized by the closing of the switch 24, the screens of slides are moved in one direction to bring the character "R" in registration with the slots in the casing, and when in this position, the contact arm 34 engages the contact 37 which completes an electric circuit to the electric lamps 16 and 17 making the character "R" appear red through the slots. The electrical current passes to the contact arm 34 from the battery 30 by the wires 29, 28, and 35 and passage from the contact to the electric lights 16 and 17 by wires 39 and 38, and from the electric lights to the grounds 43 by the wires 44. As soon as the electromagnet 20 is deenergized by opening the switch 24 the screens or slides are returned to their initial position. When the magnet 21 is energized by closing the switch 24', the slides or screens are moved in an opposite direction, bringing the character "L" in registration with the slots 10 of the casing and at the same time, the contact arm 34 engages the contact 36 completing an electric circuit to the electric lamps 14 and 15 causing a green light within the casing which renders the character "L" green to indicate a turn to the left. The electrical current passes from the battery to the contact arm by way of the wires 29, 28 and 35 and from the contact 36 to the electric lights 14 and 15 by the wires 49 and 45, and from the electric lights 14 and 15 through the wires 50 and 44 to the grounds 43.

Referring to my modified form of means for operating the screens or slides as illustrated in Figures 13 to 16 inclusive, one of the supporting members 12 has formed thereon an arm 51 to which a cable 52 is connected and the cable extends through a flexible housing and is connected to an arm 53 formed upon a controlling lever 54. The controlling lever 54 is pivoted to a supporting plate 55 as illustrated at 56 and which supporting plate is adapted to be connected to any desired point on the automobile 9 which is convenient to the operator. The housing 54' extends into the casing to a point in close proximity of the connection of the cable 52 to the arm and has its other end terminating adjacent the supporting plate 55 and is conveniently connected to the automobile 9 so that the swinging movement of the arm 53 caused by the lever 54 will push and pull the cable in said housing to rock the arm 51 and also the supporting member 12 which will move the characters "R" and "L" in registration with the slots 10 of the casing. On one side of the controlling lever 54 is stamped or otherwise applied the character "L" while on the other side the letter "R." Switches 57 and 58 are arranged on opposite sides of the controlling lever 54 and mounted on the supporting plate 55 and are in the form of push buttons so that on swinging the controlling lever to move the characters "R" and "L" in registration with the slots, the switches 57 and 58 will be closed. The switches 57 and 58 are connected by a wire 59 which is connected to one pole of a battery 60 by a wire 61. The other pole of the battery is connected to a ground 62 by a wire 63. The electric lights 16 and 17 which are of red color and in my modified form of invention are connected by a wire 64 which is connected to the switch 57 by a wire 65, and the electric lights 16 and 17 are connected to grounds 66 by wires 67 so that when the switch 57 is closed, an electric circuit is completed to the electric lamps 16 and 17 causing a red light in the casing. The switch 57 is manually closed by a person when desiring to make the character "S" red to indicate "Stop" and said switch is also closed when the controlling lever 54 is moved in one direction to bring the character "R" in registration with the slots of the casing so as to render the character "R" red, indicating a turn to the right. The electric lamps 14 and 15 are connected together by a wire 68 which is connected to the switch 58 by a wire 69 and the electric lamps 14 and 15 are connected to the wires 67 leading to the grounds 66 by wires 70 so that on closing the switch 58 an electric circuit will be closed to the green electric lights 14 and 15 rendering a green light within the casing. When indicating a slow speed the switch 58 is closed manually illuminating the character "S" a green color and when the controlling lever is moved in one direction to move the character "L" in registration with the slots of the casing, said lever closes the switches 58 illuminating the green lights, causing the letter "L" to appear green for the purpose of indicating a turn to the left.

One of the supporting members 12 is provided with a set screw 72 for adjusting the movement of the screens or slides and the arm 51 is provided with an opening to receive the cable 52 and which cable has mounted thereon springs 73 that permits said cable to have a greater movement in either direction than said arm.

The screens or slides may be constructed of celluloid and have their ends bent rearwardly upon themselves to fit over the edges of the supporting members 12 and are secured to said members in any desired manner and also in such a way that the screens or slides can be detached from said members when desired.

While I have shown and described the preferred embodiment of my invention, it will be understood that minor changes in construction, combination, and arrangement of parts may be made without departing from the spirit and scope of the invention as claimed.

Having this described my invention, what I claim is:—

1. An automobile signal comprising a casing having its front and rear walls provided with slots, supporting members pivoted in said casing and located at the ends of said casing, character bearing screens secured to the supporting members and lying in close relation to the inner faces of the front and rear walls, and means for imparting movement to the supporting members in either direction.

2. An automobile signal comprising a casing having its front and rear walls provided with slots, vertical supporting members pivoted in the casing adjacent its end walls, screens bearing characters having their ends secured to the vertical edges of the supporting members and supported by said members in close relation to the inner faces of the front and rear walls, and means for imparting movement to the supporting members in either direction.

3. An automobile signal comprising a casing having slotted front and rear walls, supporting members pivoted in said casing, screens secured to the supporting members, groups of characters applied to the screens, said casing having its front and rear walls of a color corresponding to the characters, illuminating means in said casing of different colors and means for illuminating the illuminating means and for imparting movement to the supporting members.

4. An automobile signal comprising a casing having slotted front and rear walls, brackets located in the casing and secured to the end walls of said casing adjacent their upper and lower ends, supporting members journaled to the brackets and extending parallel with the end walls, screens secured to the vertical edges of the supporting members and having characters thereon, and electrical means for imparting movement to the supporting members and for illuminating the characters.

In testimony whereof I affix my signature in presence of two witnesses.

NORTON BROWNE.

Witnesses:
J. A. VAN SLYKE,
C. B. VAN SLYKE.